Feb. 28, 1956 W. E. SHORE 2,736,203
MECHANICAL MOVEMENT
Filed Sept. 9, 1950 3 Sheets-Sheet 1

INVENTOR
WILLIAM E. SHORE
BY
Emery, Varney, Whittemore & Dix
ATTORNEYS

Feb. 28, 1956  W. E. SHORE  2,736,203
MECHANICAL MOVEMENT
Filed Sept. 9, 1950  3 Sheets-Sheet 2
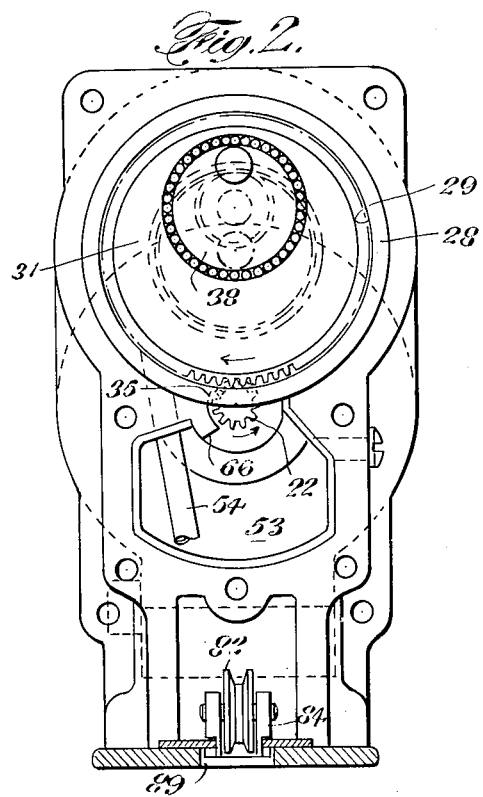
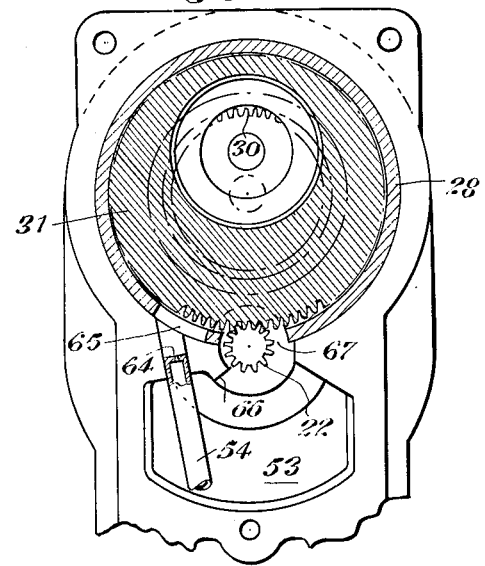
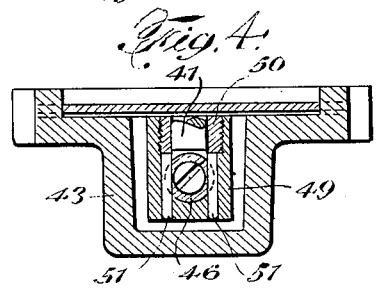
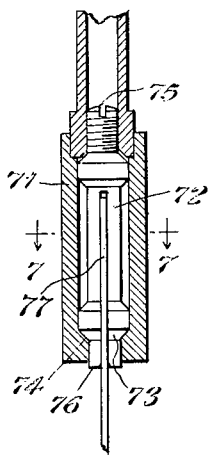
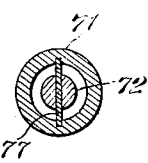
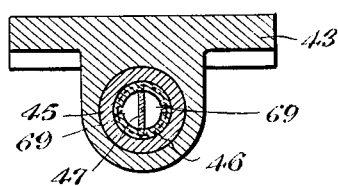
INVENTOR
WILLIAM E. SHORE
BY
Emery, Varney, Whittemore & Dix
ATTORNEYS Feb. 28, 1956  W. E. SHORE  2,736,203
MECHANICAL MOVEMENT
Filed Sept. 9, 1950  3 Sheets-Sheet 3
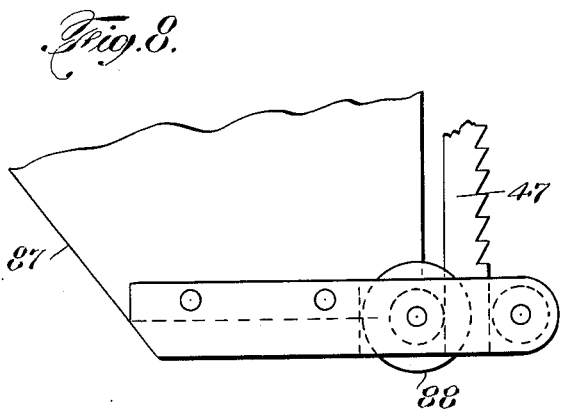
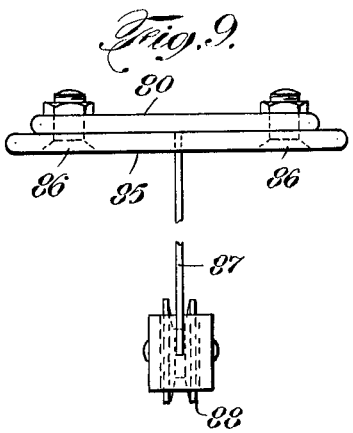
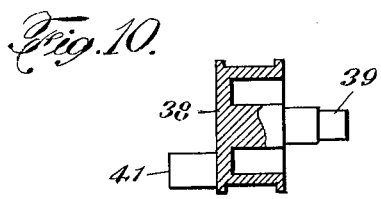
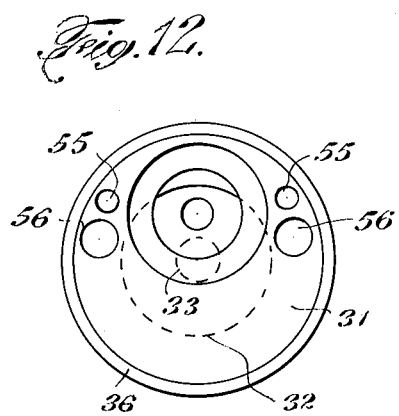
INVENTOR
WILLIAM E. SHORE
BY
Emery, Varney, Whittemore & Dix
ATTORNEYS

United States Patent Office 2,736,203
Patented Feb. 28, 1956

2,736,203

MECHANICAL MOVEMENT

William E. Shore, West New Brighton, N. Y., assignor to Harold S. Forsberg, Shelton, Conn.

Application September 9, 1950, Serial No. 183,988

17 Claims. (Cl. 74—52)

This invention relates generally to motor driven tools. More particularly the invention relates to improvements in electric hand saws in which the saw blade is of the saber type and has a reciprocating motion imparted thereto, and in which the saw table is moved over the material to be sawed as the operator guides the saw blade along the line of the cut which is being made.

It is an object of the invention to provide a compact electric hand saw of rugged construction. Another object of the invention is to provide a long stroke saw having a minimum number of small strong parts arranged in compact form. It is a further object of the invention to provide a high speed electric hand saw in which the moving parts of the mechanism for converting the rotary motion of the driving motor to reciprocating motion of the saw blade are provided with special bearing surfaces which reduce wear to a minimum. Another object of the invention is to provide motion converting mechanism in which the land surfaces of the gear teeth serve as bearing surfaces. Still another object of the invention is to provide a saw in which the motion converting mechanism utilizes the known principle of the straight line hypocycloid, and is constructed in such a manner as to permit high speed operation with a minimum of vibration. A further object of the invention is to provide an improved lubricating arrangement for the motion converting mechanism. Another object of the invention is to provide a saw in which the saw blade ram is pneumatically supported in a substantially floating condition within its sleeve bushings when the saw is in operation. It also is an object of the invention to provide a hand saw which is simple in construction, easy to assemble and operate, and which will give long continued service under rigorous working conditions. Other objects and advantages of the invention will appear hereinafter and will become evident as the description proceeds.

A preferred embodiment of the invention selected for purposes of illustration and description is shown in the accompanying drawings, wherein:

Figure 2 is an end view of the saw with the saw ram housing removed to disclose the motion converting mechanism, this view being taken substantially on the line 2—2 of Figure 1;

Figure 3 is a partial vertical section to disclose more fully the gear mechanism, this being a view taken substantially on the line 3—3 of Figure 1;

Figure 4 is a horizontal sectional view through the saw ram housing showing the connection between the saw ram and its coupling member, this view being taken substantially on the line 4—4 of Figure 1;

Figure 5 is a horizontal sectional view through the saw ram showing one arrangement for holding the saw blade in the saw ram;

Figure 6 is a vertical section through a modified arrangement for holding the saw blade in the saw ram by means of a chuck;

Figure 7 is a horizontal section through the chuck of Figure 6, taken substantially on the line 7—7 of that figure;

Figure 8 is a fragmentary side view of the saw fence and additional guide means for the unsupported end of the saw;

Figure 9 is an end elevation of the saw fence and guide means for the unsupported end of the saw;

Figure 10 is a side view, partly in vertical section, of the rotatable drum member showing the hollow construction;

Figure 11 is a vertical longitudinal section through the master gear with its integral co-axial hub and bearing shaft; and Figure 12 is an elevation of the master gear member from its front end showing the location of holes in the master gear for balancing purposes.

Figure 1:
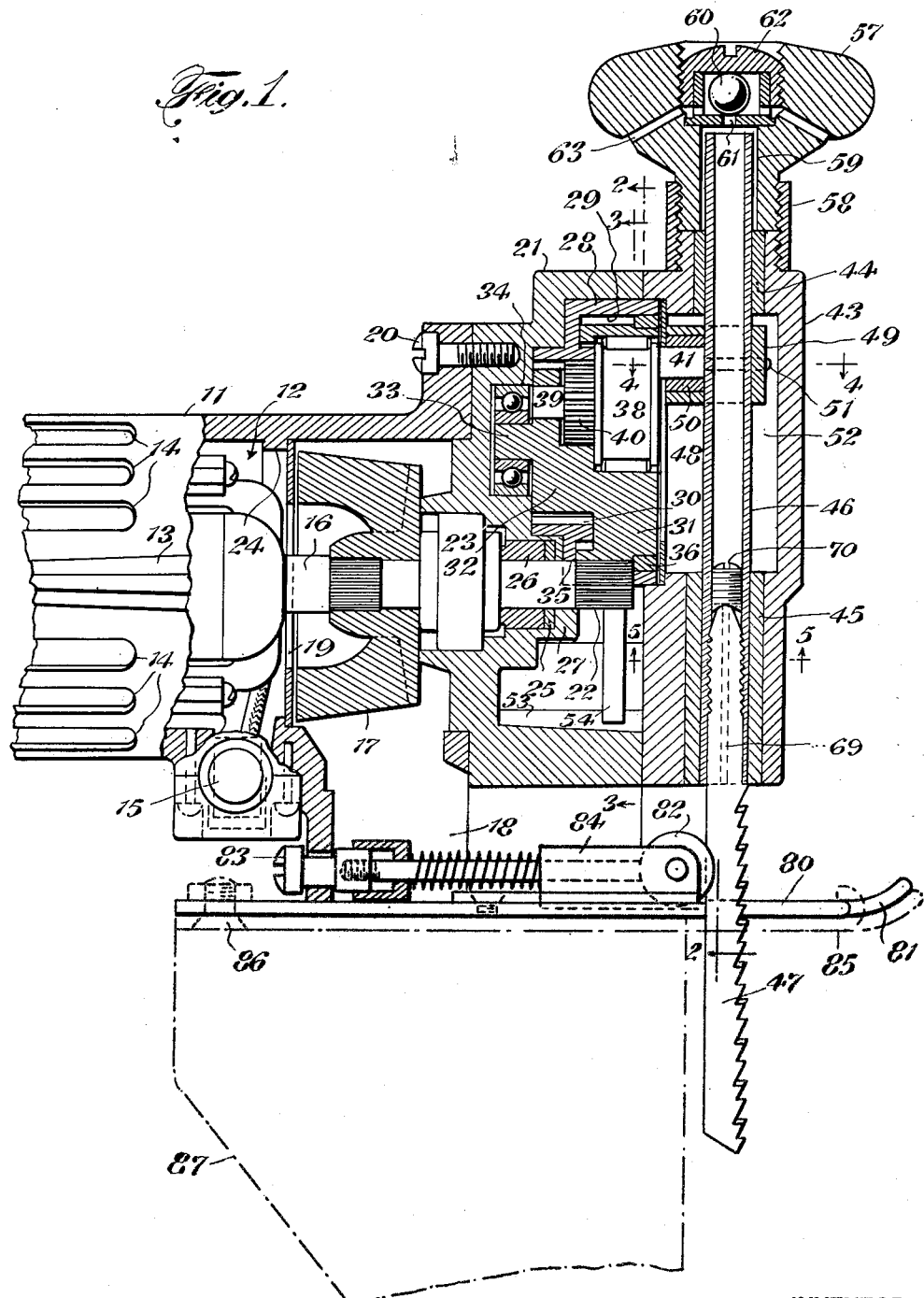
Figure 1 is a side view of a saw, the gear box housing and motion converting mechanism being disclosed substantially in vertical section.

Referring to the drawings, and first to Figure 1, 11 is a tubular housing which encloses the electric motor 12. Ordinarily this motor housing will be small enough to be held in one hand. The motor housing may be provided externally with ribs such as 13, or the like, to make it easier to hold the saw without turning or slipping in the hand. Desirably the motor housing will be provided with relatively narrow, longitudinally extending openings such as 14 for the entrance of air into a slight space between the wall of the housing and the field windings of the motor. Air drawn inwardly through the openings 14, by means hereinafter described, will then move longitudinally of the housing immediately under the housing wall. This thin layer of moving air partially insulates the housing wall from the heat of the motor and serves to cool the housing wall where it is grasped by the hand of the operator. By reason of this construction the saw may be held continuously in the bare hand of the operator without discomfort even though the motor or other parts of the saw are operating at temperatures which would be uncomfortable to the touch.

The motor 12, only one end of which is shown, may be of conventional type. Electric current will be supplied to the motor through an electric cord, not shown, entering the left-hand end of the motor housing, as viewed in Figure 1. Operation of the motor will be controlled by a switch 15 conveniently mounted in or on the wall of the housing 11 at any desired location for convenient actuation while holding the saw in the hand ready for sawing.

Mounted on the motor shaft 16 near its forward end so as to turn with the shaft is a multi-vaned fan blade 17 which serves to draw air longitudinally through the motor 12 in conventional manner, and also through the openings 14 and along under the wall of the motor housing 11. This air is discharged through the opening 18 in the lower front portion of the motor housing 11. Preferably the air discharged through the opening 18 is directed toward the saw blade 47 and along the line of the cut being made so as to blow the sawdust away from in front of the saw blade when the saw is in use.

Mounted transversely within the housing 11 immediately to the rear of the fan blade 17 is an air-deflecting, annular partition wall 19. This partition wall may be secured within the housing 11 in any suitable manner, as by being held or secured against a flange 24 formed on the inner wall of the housing. When the motor is operating, air will be forced radially outwardly between the vanes of the fan blade under the action of centrifugal force and the surrounding atmospheric pressure will cause this air to be replaced by air drawn lengthwise through the motor 12 and between the motor and the wall of the housing 11, the air entering the housing through the openings 14 in the housing wall and entering the motor through openings in the other end of the motor housing. The air passes through and around the motor, cooling the motor and the motor housing, and at the forward end of the motor is deflected inwardly toward the motor shaft 16 by the annular partition wall 19. The air then is discharged by the fan blade from the forward end of the housing through the opening 18. If desired, additional escape openings for the air may be provided in the wall of the housing 11 forwardly of the annular partition wall.

Secured on the open forward end of the motor housing 11 is a gear box housing 21 containing mechanism for converting the rotary motion of the motor shaft into reciprocating movement which can be utilized for driving the saw blade holder or ram. The gear box 21 may be secured to the motor housing, for example, by means of screws passing through holes in a peripheral flange at the forward end of the motor housing and engaging tapped holes in the gear box. One such screw is shown at 20. The rear wall of the gear box 21 substantially closes the forward end of the motor housing except for the air discharge opening 18.

The forward end of the motor shaft 16 extends through the rear wall of the gear box 21 and has secured on its forward end, within the gear box, a pinion gear 22 for driving the motion converting mechanism which will be described hereinafter. The forward end of the motor shaft is supported by a suitable bearing in the gear box, for example a ball bearing 23, which desirably will be mounted in a recess formed in the motor side of the rear wall of the gear box.

Surrounding the motor shaft between the bearing 23 and the pinion 22 there desirably is provided a sealing gland. One suitable form of sealing gland is shown and will now be described. In the illustrative embodiment the rear wall of the gear casing is counterbored concentric with the motor shaft bore and formed with a flange 27 at the bottom of the counterbore to receive and hold the sealing gland. A felt packing washer 25 is inserted in the bottom of the counterbore against the flange and a tight fitting annular gland member 26, preferably of hard graphite, then is pressed into the counterbore against the felt packing washer. The graphite gland member is firmly held in the counterbore by the friction between its outer wall and the wall of the counterbore and also by engagement at its rear end with the polished projecting shoulder of the inner race of the ball bearing 23. A low friction seal thus is provided where the motor shaft passes through the gear casing wall.

The novel mechanism contained within the gear box 21 for converting the rotary motion of the driving pinion 22 into straight line reciprocating motion which can be used for driving the saw blade holder utilizes the well known geometrical principle of the hypocycloid. The hypocycloid is a curve generated by a point on the circumference of a circle of radius $a$ which rolls without slipping on the inside of a fixed circle of radius $c$. When the diameter $a$ of the rolling circle is equal to one-half of the diameter $c$ of the fixed circle, the hypocycloid becomes a straight line which is a diameter of the fixed circle.

It has been suggested heretofore to employ mechanisms operating on the principle of the straight line hypocycloid for converting rotary motion to straight line reciprocating motion for useful purposes. Serious problems have been encountered in attempts to devise mechanism which would convert any useful amount of power by this principle without undue vibration and without excessive wear of the moving parts. According to the present invention, mechanism is provided in which the tendency of short rotating parts to wobble is minimized by providing bearing surfaces extending the full lengths of the rotating parts; in which firm bearing surfaces for the rotating parts are located at the points of greatest thrust; in which lubrication of the bearing surfaces is positive; and in which vibration may be kept to a low value. As a result, mechanism is provided in which wear will be kept to a minimum and a highly useful tool is produced.

Firmly secured in the upper part of the gear box 21 with its longitudinal axis parallel to the pinion 22 is a stepped circular gear casing 28. This gear casing is provided at its forward end, the right hand end as viewed in Figure 1, with a journaal bearing 29, and at its other and smaller end with a co-axial annular gear 30. As shown in the illustrative embodiment the open forward end of the gear casing projects slightly beyond the end of the gear box.

Rotatably mounted within the journal bearing 29 is a master rotor 31 having an integral co-axial hub 32 extending into and journalled in the annular gear 30. Preferably an integral co-axial bearing shaft 33 extends rearwardly from the hub 32 and is journalled, as by a ball bearing 34, in the rear wall of the gear box 21. In the illustrative embodiment the master rotor is a gear and will be referred to herein as the master gear. If a direct driving connection for the master rotor be made to the bearing shaft 33, or to an extension from the hub of the master rotor, then the master rotor will not need to be a gear.

The master gear 31 is driven by the pinion 22 which is secured to the end of the motor shaft 16. Operative connection is secured through a counterbore 35 made from the rear in the lower edge of the gear casing 28, parallel to the axis of the master gear and co-axial with the motor shaft. This counterbore 35 receives the pinion 22 in meshing relation with the master gear 31. When the electric motor is operating, the rotation of the pinion 22 will cause the master gear 31 to rotate within the gear casing 28.

It will be evident from the foregoing description that the master gear 31 with its integral hub 32 and bearing shaft 33 constitute a relatively short rotatable member which is supported by bearing surfaces substantially throughout its entire length. The rear end of this rotatable member comprises the bearing shaft 33 which is supported in the ball bearing 34 mounted in the rear of the gear box housing 21. The lands or tips of the teeth of the annular gear 30 provide a bearing surface for the hub portion 32 of this rotatable member, and the inner surface of the journal bearing 29 forms a bearing surface for the lands or tips of the gear teeth on the master gear 31.

This bearing for the master gear member may be and desirably will be further supplemented by an additional bearing at the outer end of the master gear 31, for example with a relatively narrow peripherally continuous rim 36 journalled in the bearing 29. Conveniently this rim comprises a narrow ring which is recessed into the teeth of the master gear substantially flush with the exposed end surface of the master gear, the outside diameter of the ring being equal to the addendum circle diameter of the master gear. By making this ring 36 sufficiently thick so that it closes the spaces between the teeth of the master gear at the exposed end surface of the master gear as shown in the application drawings, i. e. with the internal diameter of the ring not greater than the root circle diameter of the master gear, a further advantage is accomplished as will appear hereinafter in the description of the forced feed lubricating system for the master gear.

Journalled eccentrically within the master gear 31 with its axis parallel to the axis of the master gear is a rotatable drum member 38. Desirably the exposed face of this drum member is substantially flush with the face of the master gear. A roller bearing may be provided for this drum member, as shown in the drawings. Integral with the drum member and extending rearwardly therefrom is a bearing shaft 39, the end of which is journalled in the hub of the master gear. Mounted on the bearing shaft 39 so as to rotate therewith, within the annular gear 30, is a gear 40 which meshes with the annular gear. When the pinion 22 drives the master gear 31, the drum member 38 is moved in a circular orbit about the axis of the master gear, and simultaneously the drum member is rotated about its own axis by reason of the rolling of the gear 40 on the annular gear 30. The direction of rotation of the drum member will be opposite to the direction of rotation of the master gear.

The pitch circle diameter of the gear 40 is made exactly one-half the pitch circle diameter of the annular gear 30, thus meeting one of the requirements for production of a straight line hypocycloid motion. Projecting from the exposed face of the rotatable drum member 38 is a crank pin 41 which provides the driving connection to the saw ram. The extended axis of this crank pin passes through the pitch circle of the gear 40, which means that the eccentricity of the axis of this crank pin with respect to the axis of the drum member 38 is equal to one-fourth of the pitch circle diameter of the annular gear 30. In other words, the diameter of a circle generated by a point on the axis of the crank pin 41 as the drum member 38 rotates is equal to one-half the pitch circle diameter of the annular gear 30.

The requirements thus are fulfilled for production of a straight line hypocycloid movement and the crank pin 41 will be given reciprocating straight line movement upon rotation of the master gear 31 within its gear casing. The gears will be adjusted relative to each other initially so that the longitudinal axis of the crank pin will move in a vertical plane when the saw is held in upright position as in Figures 1 through 3 and desirably this will be the medial vertical plane passing through the axis of the motor shaft.

Secured on the open forward end of the gear box housing 21 is the saw ram housing 43. The saw ram housing serves as a closure member for the gear box as well as a guide for the saw ram. Conveniently the saw ram housing may be secured to the gear box in a manner similar to that described for securing the motor housing 11 to the gear box.

In the upper part of the saw ram housing there is a chamber 52 opposite the face of the master gear 31. This chamber is counterbored a short distance to receive the end of the circular gear casing 28 which projects beyond the open end of the gear box 21. In assembling the parts an annular partition disk member 48 is inserted in the bottom of the counterbore and against the forward end of the circular gear casing. This annular disk member extends radially inwardly over the bearing rim 36 and the outer edge of the master gear and serves to hold the master gear within the gear casing and against movement along its longitudinal axis. This annular disk member also closes the spaces between the teeth of the master gear at the end surface of the gear, or serves as a supplemental sealing member to the bearing rim 36 to accomplish that result.

The lower part of the saw ram housing provides a flush covering over the lower part of the gear box, forming an oil well 53, the function of which will be described hereinafter.

Mounted in vertical alignment in the top and bottom of the saw ram housing and extending through the walls of the chamber 52 are cylindrical sleeve bearings and guides 44 and 45, respectively. Slidably mounted in these sleeve bearings with a close sliding fit is the tubular saw ram 46. The lower end of the saw ram is provided with means for clamping and holding the shank of a saw blade 47. The guides 44 and 45 are located so that the longitudinal axis of the saw ram lies in the medial vertical plane through the saw and at right angles to the longitudinal axis of the crank pin 41. Intermediate its ends the saw ram is coupled to the crank pin so that as the crank pin moves up and down when the motor is running the saw ram will be given a rapid reciprocating movement in the guides 44 and 45.

Since the movement of the crank pin 41 is in a straight line and parallel to the motion of the saw ram, the crank pin can be coupled to the saw ram by simple apparatus. Reference is made particularly to Figures 1 and 4 of the drawings in connection with the following description of the coupling which is disclosed in the illustrative embodiment.

The coupling member 49 conveniently may be made from a piece of square steel stock which is bored to slide onto the saw ram. This coupling member has a second bore at an angle of 90 degrees from the first bore and mounted in this second bore is a journal bearing 50 for the crank pin 41. This second bore may be screw threaded, in which case the journal bearing 50 will be externally threaded. By counterboring or otherwise providing a flat surface on the rear side of the saw ram at the desired point of connection to the coupling member 49 it will be possible to employ the screw threaded journal bearing 50 as a set screw to lock the coupling member 49 to the saw ram. Alternatively, as shown in the drawings, the coupling member 49 may be connected to the saw ram 46 by locking pins 51 inserted in holes in the coupling member and engaging transverse grooves in the wall of the saw ram.

From the foregoing description it will be evident that when the electric motor 12 is energized the pinion 22 will drive the master gear 31. As the master gear rotates it carries the eccentrically journalled drum member 38 in its orbit about the axis of the master gear. The stationary annular gear 30 meshing with the gear 40 on the shaft of the drum member causes the drum member to rotate about its own axis simultaneously, but in opposite direction to the master gear. The crank pin 41 projecting from the face of the drum member moves up and down in a straight line, and through the coupling member 49 imparts reciprocating movement to the saw ram 46. Thus the rotary motion of the electric motor shaft is converted into reciprocating motion for sawing.

The mechanism disclosed for accomplishing the objects of this invention has important advantages because of its simple construction in which the surfaces of the relatively short rotating parts are utilized throughout their lengths for bearing load, so as to minimize the danger of wobbling. A compact saw driving mechanism is produced which has very low wear and which is capable of giving long continued service under arduous working conditions.

With the compact arrangement and relatively small size of the rotating parts of applicant's motion converting mechanism, vibration will be kept to a small value. This is true even though the saw be operated at high speed and with long stroke. Vibration and wear may be further reduced by lightening the master gear on its side in which the rotatable drum member 38 is eccentrically journalled, so as to compensate completely or in part for the mass of the crank pin 41, the coupling member 49, the saw ram 46, and the saw blade 47. To this end the rotatable drum member 38 may be made hollow, substantially as shown in Figure 10. Also, metal may be removed from the master gear by drilling one or more pairs of similar holes 55 and 56 similarly disposed on opposite sides of the plane through the axes of the master gear and the eccentrically journalled drum member, as shown in Figure 12.

Vibration and wear of the moving parts may be further reduced by what might be referred to as pneumatically suspending the saw ram 46. It will be understood that the use of this refinement is discretionary.

Referring to Figure 1 of the drawings it will be seen that when the tubular saw ram 46 is in its uppermost position the ram projects above the upper end of the upper guide 44. Secured on the upper end of the saw ram housing 43 over the guide 44 is a knob handle 57 which may be grasped with one hand of the operator to assist in holding and guiding the saw when it is in use. Conveniently the knob 57 may be secured to the saw ram housing by a threaded ferrule 58, as shown. The konb 57 has a cylindrical bore 59 co-axially aligned with the saw ram 46. The diameter of the bore 59 is slightly larger than that of the saw ram and its length provides a slight clearance for the end of the ram when the ram is at the top of its stroke.

Located within the knob at the top of the bore 59 is a check valve arrangement which operates to permit escape of air from the bore 59 automatically when the pressure within the bore reaches a predetermined value during the upstroke of the saw ram. This check valve substantially prevents return of air into the bore and a partial vacuum is created in the bore on the downstroke of the saw ram.

The check valve comprises a valve ball 60 made of oil-proof resilient material which is held firmly against the valve opening 61 at the top of the cylindrical bore 59 by the screw plug 62 located in the top of the knob 57. When the saw is not operating and the air pressure within the cylindrical bore 59 is substantially equal to the surrounding atmospheric pressure, and also when the saw ram is moving downwardly with consequent reduction of pressure within the cylindrical bore 59, the valve ball 60 effectively seals the valve opening 61. When the saw ram is moving upwardly the pressure within the bore 59 is increasing and if the pressure reaches a sufficiently high value, dependent on the pressure of the screw plug 62 against the resilient valve ball, the air will force the surface of the resilient valve ball away from the valve opening 61 slightly and momentarily to permit escape of some air from the cylindrical bore 59 out through the ducts 63 in the knob.

In operation, when the saw ram is moving upwardly, pressure on the air within the cylindrical bore 59 is building up and as the ram approaches the upper end of its stroke this body of compressed air serves as a cushion to slow up the ram and to reduce the shock incidental to reversal of direction of the ram at the end of its stroke. As the saw ram starts its downward movement the compressed air within the cylindrical bore 59 assists and hastens such movement, but the air volume is small and the pressure within the bore rapidly becomes less than the surrounding atmospheric pressure. Continued downward movement of the saw ram driven by the motor and gearing results in a further reduction of pressure within the cylindrical bore, creating partial vacuum tending to slow up further downward movement of the saw ram. As a result, the atmosphere serves as a cushion to slow up the saw ram as it approaches the lower end of its stroke and thus to reduce the shock incidental to reversal of direction of the ram at the end of its stroke. In effect, a pneumatic shock absorber is provided which cushions the saw ram at each end of its stroke and thus reduces vibration and wear of the moving parts.

In order further to reduce wear of the moving parts a forced feed lubricating system desirably is provided to supply a constant flow of oil to the master gear when the saw is operating.

As may be seen in Figures 2 and 3, the interior of the gear box housing 21 is substantially divided into upper and lower chambers which are connected by a restricted passageway in which is located the pinion 22. Secured in the upper chamber of the gear box is the circular gear casing 28 and the associated mechanism which has been described hereinabove. The lower chamber 53 in the gear casing has already been referred to as an oil well.

A tube 54 has one end open in the bottom of the oil well 53. The other end of this tube has a restricted passageway 64 which is open to an aperture 65 in the wall of the circular gear casing 28. This aperture 65 preferably is in the form of a relatively narrow slot extending circumferentially of the gear casing for a distance extending over several of the teeth of the master gear 31. The aperture 65 is located near the counterbore 35 in the gear casing for the pinion 22, and to the side of the pinion where the teeth of the master gear are moving up and away from the pinion, that is at a point beyond the angle of recess with the pinion. As shown in Figure 3, the pinion 22 rotates counterclockwise, the master gear rotates clockwise, and the aperture 65 is located in the wall of the gear casing to the left of the pinion 22.

It has been pointed out hereinabove that the master gear 31 fits snugly to the wall of the circular gear casing 28, the inner surface of the gear casing forming a bearing surface for the lands of the gear teeth. The edge of the gear casing wall at the counterbore 35 has a similar fitting with the gear teeth of the pinion on the side toward the aperture 65. The gear box housing 21 desirably will be provided with an integral abutment wall 66 extending the area of this bearing engagement with the face of the pinion 22. The edge of the gear casing wall on the opposite side of the pinion 22, that is ahead of the angle of approach between the master gear and the pinion, is spaced a short distance from the face of the pinion to provide an opening 67 for discharging oil from the face of the master gear to the oil well as the master gear rotates. It has already been pointed out that the bearing rim 36 recessed into the teeth of the master gear may be made sufficiently thick to close the spaces between the teeth of the master gear at the exposed end surface of the gear, and also that the annular partition disk member 48 completes or supplements such closure. It will be evident that the described structure constitutes a gear pump for circulating the oil from the oil well 53 over the periphery of the master gear.

In operation, when the pinion 22 is rotating in a counterclockwise direction and the master gear 31 is rotating in a clockwise direction, the teeth of both gears are moving away from the aperture 65 and the resultant low pressure or suction will draw oil from the oil well 53 through the tube 54 and aperture 65 to the face of the master gear 31. With the arrangement as shown a substantial volume of this oil will be carried between the teeth of the master gear as it rotates and will be discharged through the opening 67 back into the oil well 53. Some of the oil also will be carried from the face of the master gear by the teeth of the pinion 22 past the abutment wall 66 and discharged into the oil well.

The means for receiving and holding the saw blade 47 in the lower end of the saw ram 46 will be described next. In the embodiment of Figure 1 the lower end of the ram is screw threaded internally and then two opposite slots 69 are formed in the screw threaded portion of the ram wall, extending longitudinally of the ram. The shank of the saw blade is formed with serrated edges of shape and pitch and of blade width to match the screw threads within the ram.

To insert a saw blade in the raw ram the shank of the blade is pushed into the slots 69 to the desired length and then given a quarter turn to engage the serrations of the shank with the screw threads within the ram. The headless set screw 70 then is tightened down upon the end of the blade to hold the blade firmly in the saw ram. The set screw 70 may be turned simply by removing the knob handle 57 and inserting a screw driver into the upper end of the saw ram. With the arrangement described it is unnecessary to provide the shank portion of the saw blade with a narrow section for effecting a bayonet type connection as has been the practice in the past and a stronger blade is provided with reduced likelihood of breakage of the blade when the saw is in use.

Figures 6 and 7 disclose a modified arrangement for holding the saw blade in the saw ram which permits use of a saw blade having a straight edged shank which is the full width of the saw blade. In this embodiment the lower end of the saw ram is provided with a slotted chuck member 72 which has formed near its forward or lower end a tapered shoulder 73 conforming to the tapered internal flange 74 in the lower end of the ram tube 71. The shank of the saw blade is as wide as the saw and the sides are straight. This design has maximum strength and permits economies in manufacturing cost. When the shank 77 of the saw blade is inserted into the chuck member 72 and the headless set screw 75 is tightened down to press the tapered shoulder 73 against the tapered flange 74, the chuck will be closed tightly on the blade and the blade will be held firmly in sawing position in the ram tube.

Desirably the slotted saw chuck 72 is made long enough below the flange 74 so that the end thereof protrudes slightly beyond the bottom of the saw ram as shown at 76. This facilitates inserting a saw blade into the chuck, because the chuck member 72 is free to turn within the ram tube. When inserting a saw blade, the end of the blade shank can be inserted into the slot in the protruding end portion 76 of the chuck and the chuck then turned, merely by turning the blade in the hand, as may be necessary to align the chuck slot with the slot in the lower end of the ram tube.

Secured to the lower forward portion of the motor housing 11, or to the bottom of the gear box housing 21, or to both, by means of countersunk screws is a saw table 80 which rests against the material being sawed and moves over the surface thereof when the saw is in operation. Air delivered from the fan blade 17 through the opening 18 will be deflected forwardly over the top of this table past the saw blade 47 to blow sawdust away from in front of the blade. The saw table 80 is of convenient size and preferably has its forward edge turned upwardly as shown so as to slide easily over the surface of the material being sawed. The saw table also may be forked or slotted at its forward edge, as shown at 81, to make it easier to observe the cutting operation and to guide the saw blade along its desired course. In operation the saw teeth cut as they move toward the saw table, thus helping to hold the saw in firm engagement with the material being sawed.

The saw blade may be supported along its back edge adjacent the saw table by a roller 82 which preferably is mounted in a slide 84 in a slot 89 in the saw table so as to be adjustable toward and away from the saw blade, for example by means of the adjustment screw 83.

The portable hand saw of the present invention can be used for cutting along a straight line. It can be used also for cutting to curved or irregular lines, for cutting out key holes, for lock fitting, and the like. By using a sufficiently long blade the portable hand saw of the present invention can be used for sawing wood up to three inches or more in thickness. In case the saw is to be used for sawing lumber of such thickness it will be desirable to employ a saw fence and an additional guide for the unsupported end of the saw blade. Means, disclosed in the form of an attachment for the saw, which accomplishes these ends is shown in Figures 8 and 9.

An auxiliary table or shoe 85 is hooked over the forward end of the stationary table 80 and secured thereto by countersunk screws 86. Extending downwardly from the auxiliary shoe 85, at right angles thereto and aligned with the plane of the saw blade, is a metal fence 87. The thickness of this fence is less than the width of the saw cut, so that the fence can follow along in the cut without binding. Secured to the lower edge of the fence 87, aligned vertically below the roller 82, is the grooved guide wheel 88 against which the back of the saw blade rests. It will be understood that the use of this attachment is limited to the making of straight cuts. This attachment is particularly useful for making straight cuts for tenons or for laps, for making cuts on corner posts, for notching rafters, and the like, where the use of circular electric hand saws is not feasible.

The invention herein disclosed may be variously modified and embodied within the scope of the subjoined claims.

I claim:

1. Mechanism for converting rotary motion to reciprocatory motion comprising, in combination, a gear box housing, a master gear, means for driving the master gear, a gear casing within the gear box housing in which the master gear rotates, the inner surface of the gear casing surrounding the master gear forming a bearing surface for the lands of the gear teeth of the master gear, an annular gear in the gear casing co-axially aligned with the master gear, an integral co-axial hub extending from the master gear into the annular gear, the lands of the teeth of the annular gear providing a bearing surface for the hub, a bearing shaft extending from the said hub and journalled in the gear box housing, a rotatable drum member eccentrically journalled in the said master gear and having a bearing shaft journalled in the hub of the master gear, the axes of the drum member and the master gear being parallel, a gear secured on the drum member shaft within the annular gear and in engagement therewith so that rotation of the master gear in the gear casing causes the drum member to rotate about its own axis while it moves simultaneously in a circular orbit about the axis of the master gear, a member to be reciprocated, and a crank pin projecting from the face of the drum member for operatively engaging the member to be reciprocated.

2. Mechanism for converting rotary motion to reciprocatory motion comprising, in combination, a master gear and driving means therefor, a gear casing in which the master gear rotates, the inner surface of the gear casing surrounding the master gear forming a bearing surface for the lands of the gear teeth of the master gear, an annular gear in the gear casing co-axially aligned with the master gear, an integral co-axial hub extending from the master gear into the annular gear, the lands of the teeth of the annular gear providing a bearing surface for the hub, a rotatable drum member eccentrically journalled in the said master gear and having a bearing shaft journalled in the hub of the master gear, the axes of the drum member and the master gear being parallel, a gear secured on the drum member shaft within the annular gear and in engagement therewith so that rotation of the master gear in the gear casing causes the drum member to rotate about its own axis while it moves simultaneously in a circular orbit about the axis of the master gear, a member to be reciprocated, and a crank pin projecting from the face of the drum member for operatively engaging the member to be reciprocated.

3. Mechanism according to claim 2, in which the eccentricity of the crank pin with respect to the axis of the drum member is equal to one-fourth of the pitch circle diameter of the annular gear.

4. Mechanism according to claim 2, in which the gear casing is open at its end in which the master gear rotates, and in which the open end of the gear casing is substantially flush with the exposed end surface of the master gear.

5. Mechanism according to claim 2, in which the gear casing is open at its end in which the master gear rotates, and in which the spaces between the teeth of the master gear are closed at the exposed end surface of the master gear.

6. Mechanism according to claim 2, in which the gear casing is open at its end in which the master gear rotates, and in which the open end of the gear casing is substantially flush with the exposed end surface of the master gear, and in which there is an annular disk member in engagement with the open end of the gear casing overlying the teeth of the master gear and closing the spaces therebetween.

7. Mechanism according to claim 2, in which the master gear has additional bearing means at its end opposite the integral co-axial hub, the said bearing means being journalled in the gear casing.

8. Mechanism according to claim 2, in which the gear casing is open at its end in which the master gear rotates, and in which a narrow ring is recessed into the teeth of the master gear substantially flush with the exposed end surface of the master gear.

9. Mechanism according to claim 2, in which the gear casing is open at its end in which the master gear rotates, and in which a narrow ring is recessed into the teeth of the master gear, the outside diameter of the ring being substantially equal to the addendum circle diameter of the master gear.

10. Mechanism according to claim 2, in which the gear casing is open at its end in which the master gear rotates, and in which a narrow ring is recessed into the teeth of the master gear, the inside diameter of the ring being not greater that the root circle diameter of the master gear.

11. Mechanism according to claim 2, in which the drum member is hollow.

12. Mechanism according to claim 2, in which the mass of the reciprocating member effective to unbalance the master gear is partially compensated for by the removal of material from the body of the master gear adjacent the drum member.

13. Mechanism according to claim 2, in which there is a pair of similar holes in the master gear, the holes being similarly disposed on opposite sides of the plane through the axes of the master gear and the eccentrically journalled drum member.

14. Mechanism according to claim 2, in which the gear casing is mounted in a gear box housing, and in which there is an oil well in the gear box housing below the master gear, and means to feed oil from the oil well to the face of the master gear within the gear casing when the gear rotates.

15. Mechanism according to claim 2, in which the gear casing is mounted in a gear box housing, and in which there is an oil well in the gear box housing, means closing the spaces between the teeth of the master gear at the exposed end surface of the master gear, and a tube extending from a point below the oil level in the oil well and communicating at its other end with the gear face of the master gear at a point beyond the angle of recess with the pinion, whereby the master gear will serve to pump oil from the oil well into the gear casing upon rotation of the master gear within the gear casing.

16. Mechanism according to claim 2, in which the gear casing is mounted in a gear box housing, and in which there is an oil well in the gear box housing, means closing the spaces between the teeth of the master gear at the exposed end surface of the master gear, a tube extending from a point below the oil level in the oil well and communicating at its other end with the gear face of the master gear at a point beyond the angle of recess with the pinion, and an opening between the gear face of the master gear and the oil well at a point ahead of the angle of approach with the pinion for discharging oil from the gear face to the oil well, whereby the master gear will serve to pump oil from the oil well through the tube into the gear casing and return the oil to the oil well upon rotation of the master gear within the gear casing.

17. Mechanism for converting rotary motion to reciprocatory motion comprising, in combination, a master rotor and driving means therefor, a gear casing in which the master rotor rotates, the inner surface of the gear casing surrounding the master rotor forming a bearing surface therefor, an integral annular gear in the gear casing co-axially aligned with the master rotor, an integral co-axial hub extending from the master rotor into the annular gear, the lands of the teeth of the annular gear providing a bearing surface for the hub, a rotatable drum member eccentrically journalled in the said master rotor, the axes of the drum member and the master rotor being parallel, a gear secured on the drum member shaft within the annular gear and in engagement therewith so that rotation of the master rotor in the gear casing causes the drum member to rotate about its own axis while it moves simultaneously in a circular orbit about the axis of the master rotor, a member to be reciprocated, and a crank pin projecting from the face of the drum member for operatively engaging the member to be reciprocated to impart reciprocating movement thereto.

References Cited in the file of this patent

UNITED STATES PATENTS

| 1,753,825 | Ford | Apr. 8, 1930 |
| 1,764,058 | Stevenson | June 17, 1930 |
| 2,438,774 | Baillie | Mar. 30, 1948 |
| 2,506,736 | Oschwald | May 9, 1950 |
| 2,547,922 | Bechtold | Apr. 10, 1951 |

FOREIGN PATENTS

| 322,983 | Great Britain | Dec. 19, 1929 |